United States Patent
Tang et al.

(10) Patent No.: US 8,254,117 B2
(45) Date of Patent: Aug. 28, 2012

(54) COMPUTER WITH SECURITY DEVICE FOR PERIPHERAL COMPONENTS

(75) Inventors: Xian-Xiu Tang, Shenzhen (CN); Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 282 days.

(21) Appl. No.: 12/821,897

(22) Filed: Jun. 23, 2010

(65) Prior Publication Data

US 2011/0248608 A1 Oct. 13, 2011

(30) Foreign Application Priority Data

Apr. 7, 2010 (CN) .......................... 2010 1 0140956

(51) Int. Cl.
*G06F 1/16* (2006.01)
*E05B 73/00* (2006.01)
*E05B 65/00* (2006.01)
*F16M 13/00* (2006.01)

(52) U.S. Cl. .................. 361/679.57; 361/679.58; 70/57; 70/14; 248/551; 248/552; 248/553

(58) Field of Classification Search .......... 361/679.01–679.45, 679.55–679.59, 361/724–727; 312/223.1, 223.2; 70/57, 70/14; 248/551, 552, 553

See application file for complete search history.

(56) References Cited

U.S. PATENT DOCUMENTS

| | | | | |
|---|---|---|---|---|
| 5,816,081 | A * | 10/1998 | Johnston | 70/58 |
| 6,836,405 | B2 * | 12/2004 | Alfonso et al. | 361/679.58 |
| 6,970,351 | B2 * | 11/2005 | Perez et al. | 361/679.57 |
| 7,443,661 | B2 * | 10/2008 | Xu et al. | 361/679.55 |
| 7,665,813 | B2 * | 2/2010 | Wang | 312/220 |
| 8,042,365 | B2 * | 10/2011 | Morrison et al. | 70/58 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A computer includes a rear panel, a peripheral component, and a security device. The peripheral component includes a connector connected to the rear panel and a cable. The security device is attached to the rear panel and covers the connector. The security device defines a guiding slot. The cable extends through the guiding slot and the security device blocks the connector from moving out of the rear panel.

7 Claims, 4 Drawing Sheets

COMPUTER WITH SECURITY DEVICE FOR PERIPHERAL COMPONENTS

BACKGROUND

1. Technical Field

The present disclosure relates to security devices, and more particularly to an anti-theft device to protect peripheral components of a computer.

2. Description of Related Art

Typically, a computer includes a plurality of peripheral components, such as printers, image scanners, mouse, keyboard, microphones, etc. These peripheral components are often connected to input/output connectors of the computer with connecting cables. The cables are easy to pull out of the computer and the peripheral components stolen, especially in some public places.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
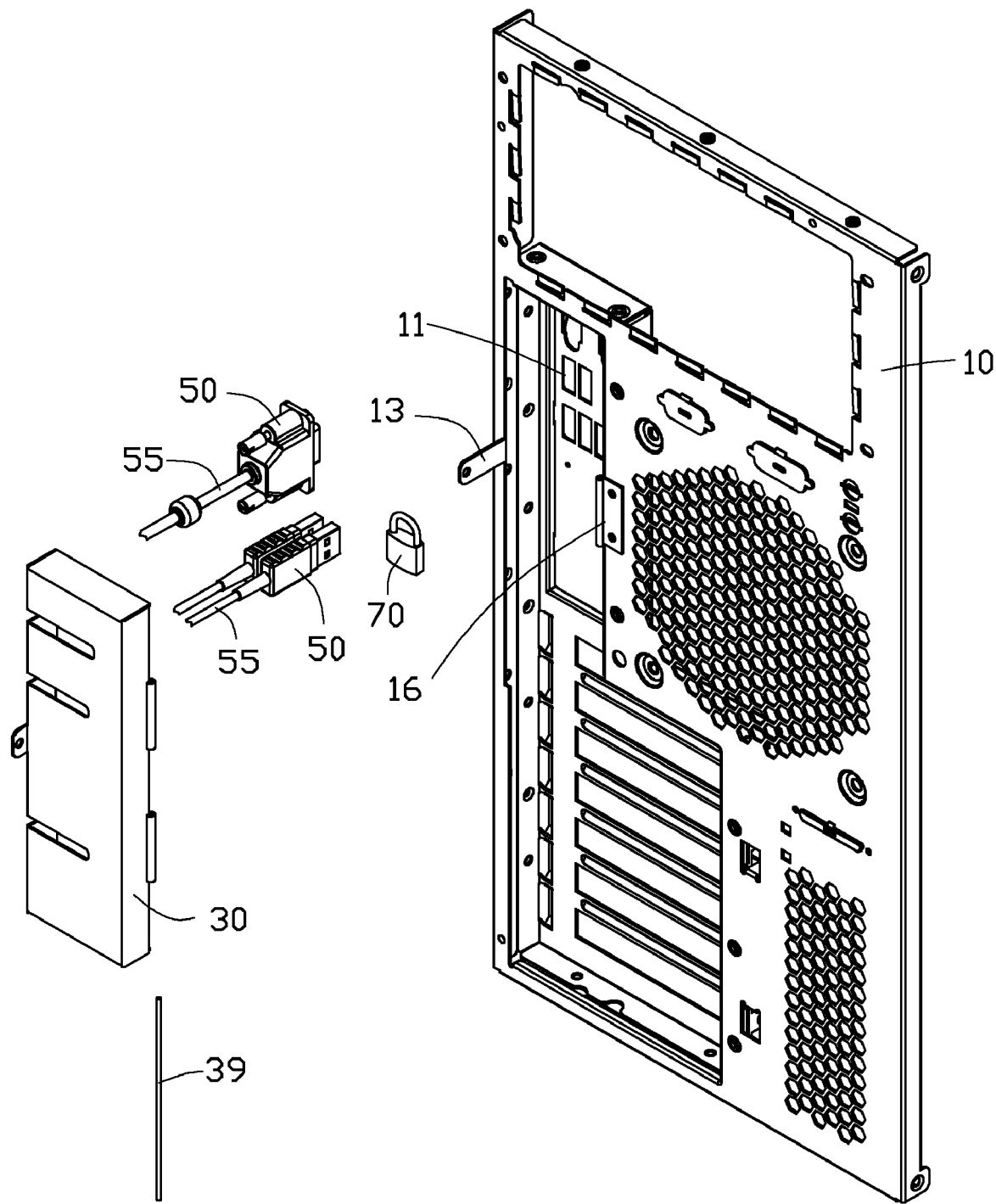
FIG. 1 is an exploded, isometric view of an embodiment of a computer.

Referring to FIG. 1, an embodiment of a computer includes a rear panel 10 and a security device 30. A plurality of peripheral components is connected to the rear panel 10. Each peripheral component includes a connecter 50 and a cable 55. The security device 30 can protect the peripheral components from being removed from the rear panel 10 without permission. In one embodiment, the peripheral components can be a printer, a mouse, a keyboard, a microphone and so on. The connector 50 can be a USB connector, a PS2 connector, or a VGA (Video Graphics Array) connector. The cables 55 can be power cables or signal cables.

The rear panel 10 can be made of flake metal and defines an I/O (input/output) area. The I/O area defines a plurality of I/O ports 11.

Figure 2:
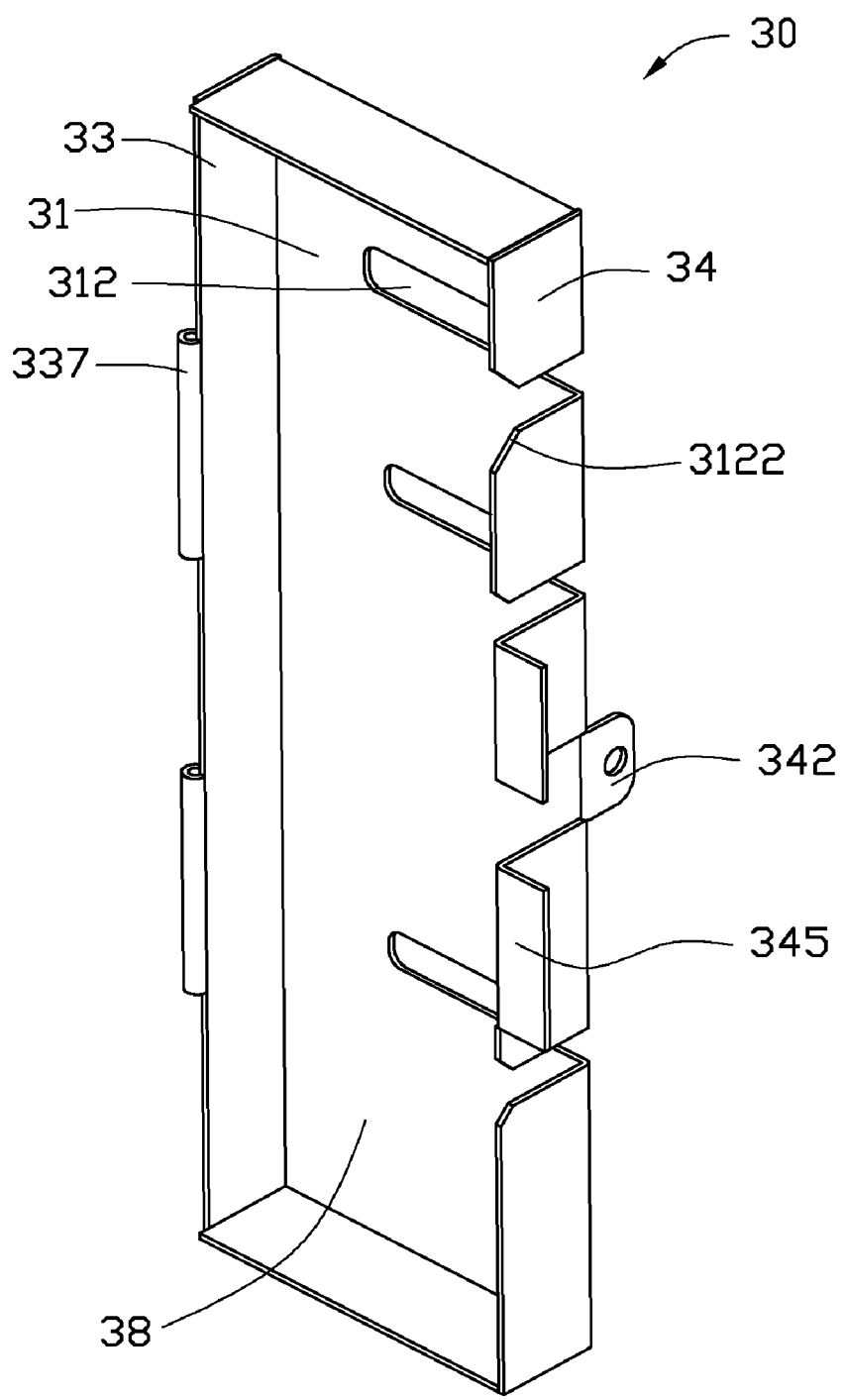
FIG. 2 is an enlarged view of a security device of FIG. 1, but shown from another aspect.

Referring to FIG. 2, the security device 30 is pivotably attached to the rear panel 10 about a pivot pin 39. The security device 30 includes a main body 31 and four flanges extending from the main body 31. A receiving space 38 is defined by the main body 31 cooperating with the four flanges. A pivot portion 16 is located on the rear panel 10. A locking tab 13 protrudes from the rear panel 10. The flanges include a first flange 33 and a second flange 34 at opposite side. A pivot portion 337 is located on the first flange 33 corresponding to the pivot portion 16. A locking tab 342 is bent from the second flange 34 corresponding to the locking tab 13. A guiding slot 312 extends from the second flange 34 into the main body 31. The guiding slot 312 is narrower than the connector 50. In one embodiment, the guiding slot 312 is aligned with the I/O ports 11 of the rear panel 10 and extends along a straight line. An enlarged guiding cutout 3122 is defined at an inlet of the guiding slot 312 in the second flange 34. A contacting tab 345 is perpendicularly located on the second flange 34 for contacting the rear panel 10.

Figure 3:
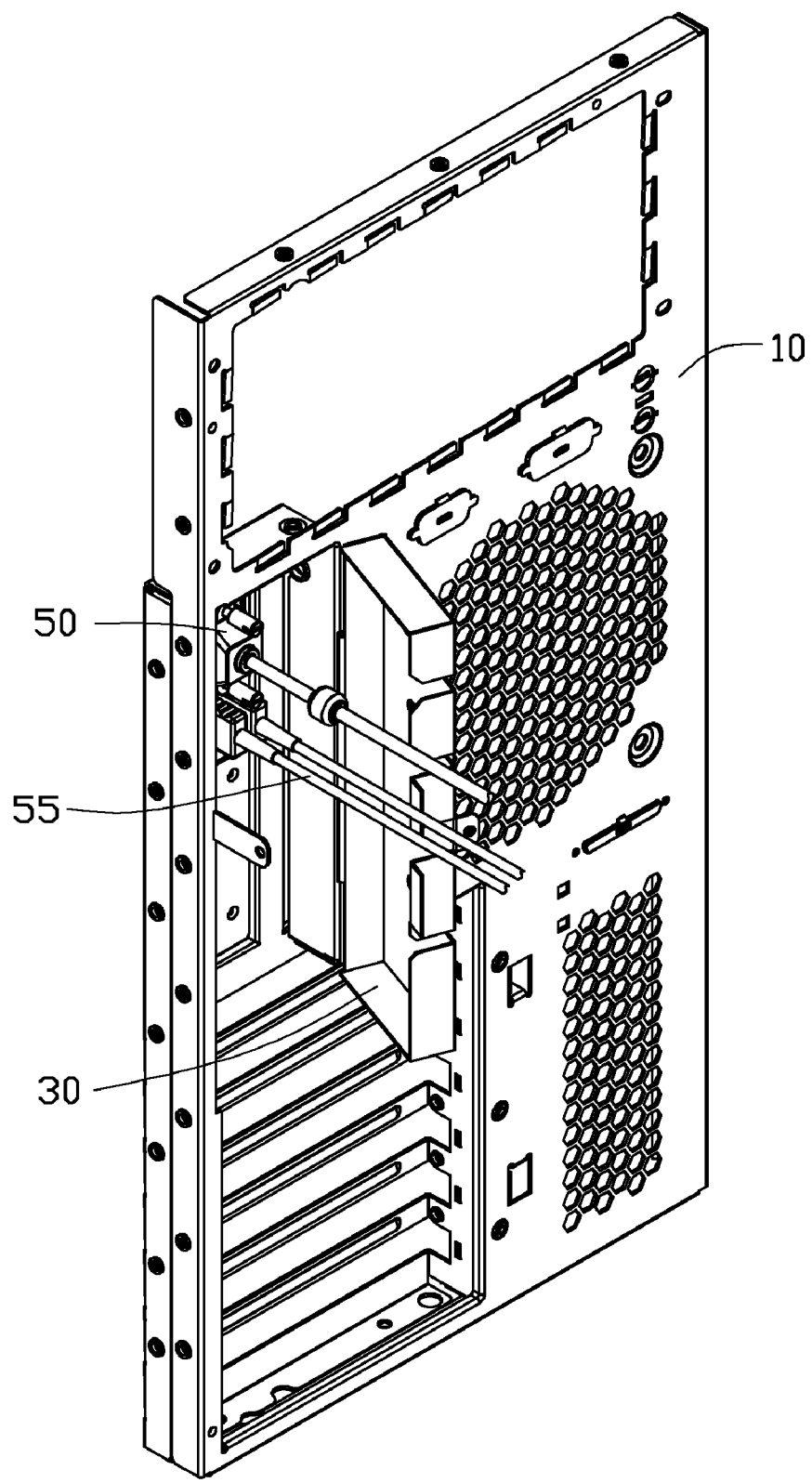
FIG. 3 is an assembled view of the computer of FIG. 1.

Referring to FIG. 3, the peripheral components are connected to the rear panel 10. The security device 30 is pivotably fixed to the rear panel 10.

Figure 4:
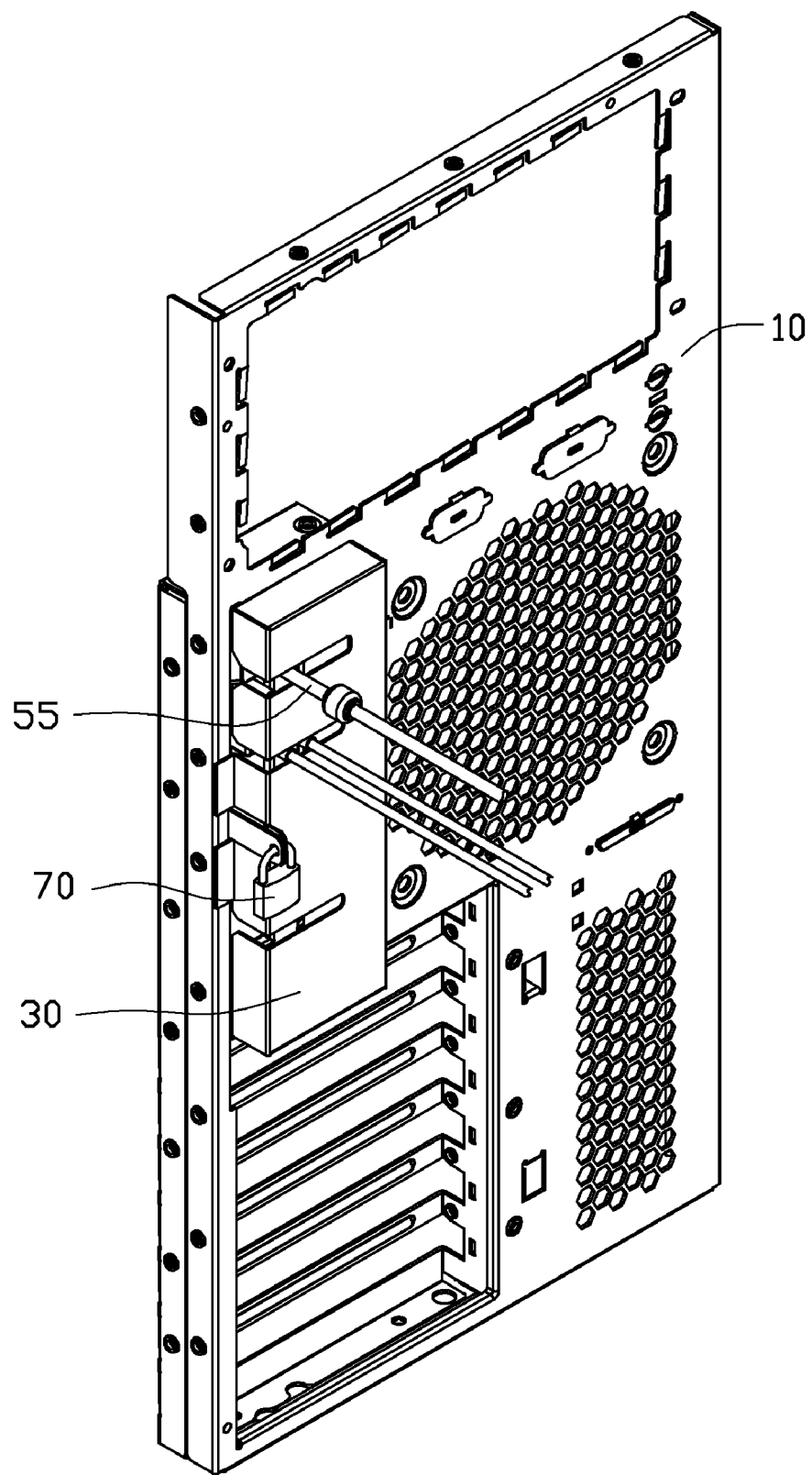
FIG. 4 is similar to FIG. 3, but showing the security device locked.

Referring to FIG. 4, in use, the security device 30 is rotated towards the rear panel 10. The cables 55 are put into the guiding slot 312 from the guiding cutout 3122. The security device 30 covers the I/O area of the rear panel 10. The locking tab 13 is aligned with the locking tab 342. A lock 70 is provided to lock up the security device 30. Therefore, the connecter 50 cannot be removed from the computer without unlocking the security device 30.

In other embodiments, the guiding slot 312 can be other shapes such as wavy, arcuate and so on. The security device 30 can block the connector 50 from being removed from the rear panel 10 or prevent the connecter 50 from being removed from the receiving space 38.

It is also to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer comprising: a rear panel; a peripheral component comprising a connector connected to the rear panel and a cable; and a security device attached to the rear panel and covering the connector, and the security device defining a guiding slot; wherein the cable extends through the guiding slot and the security device blocks the connector from moving out of the rear panel; wherein the security device comprises a main body, a first flange extends from one side of the main body, and a second flange extends from the main body at an opposite side of the first flange; wherein the guiding slot extends from the second flange to the main body; wherein the security device is pivotably attached to the rear panel at the first flange; wherein a locking tab is located on the second flange for locking the security device to the rear panel; and wherein a contacting tab is perpendicularly located on the second flange for contacting the rear panel.

2. The computer of claim 1, wherein an enlarged guiding cutout is defined at an inlet of the guiding slot in the second flange.

3. The computer of claim 1, wherein a receiving space is surrounded by the main body, the first flange, and the second flange.

4. The computer of claim 1, wherein the connector is a USB connector.

5. A computer with security for a peripheral component, comprising: a rear panel, the peripheral component connected to the rear panel; and a security device pivotably attached to the rear panel; wherein the peripheral component extends through the security device and the security device blocks the peripheral component from being removed from the rear panel; wherein the security device comprises a main body, a first flange extends from one side of the main body, and a second flange extends from the main body at opposite side of the first flange; wherein a guiding slot extends from the second flange to the main body for giving extending way to the peripheral component; wherein the security device is pivotably attached to the rear panel at the first flange; wherein a locking tab is located on the second flange for locking the security device to the rear panel; and wherein a contacting tab is perpendicularly located on the second flange for contacting the rear panel.

6. The computer of claim 5, wherein an enlarged guiding cutout is defined at an inlet of the guiding slot in the second flange.

7. The computer of claim 5, wherein a receiving space is surrounded by the main body, the first flange, and the second flange.

* * * * *